Feb. 6, 1940. C. L. WINGARD 2,189,644
MEANS FOR HOLDING TOGETHER PARTS HAVING TELESCOPIC ENGAGEMENT
Filed Nov. 3, 1937 3 Sheets-Sheet 3
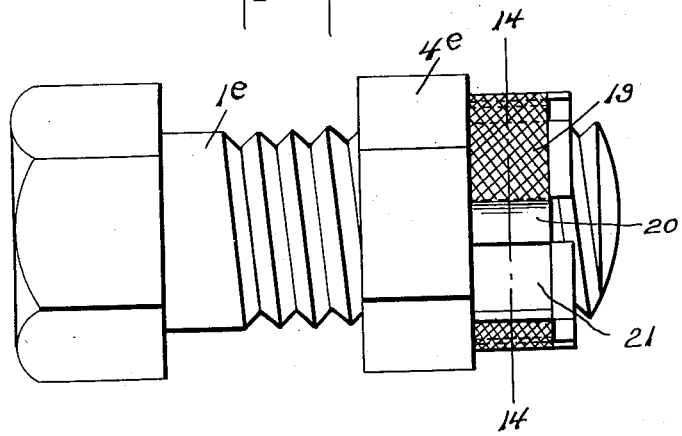
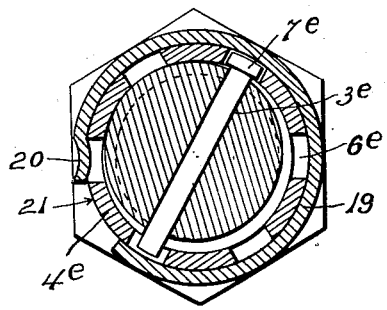 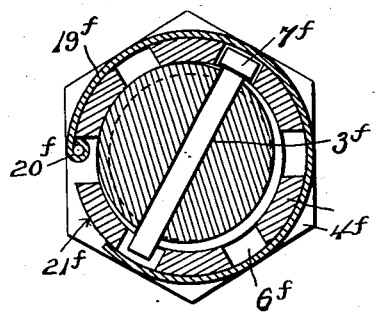

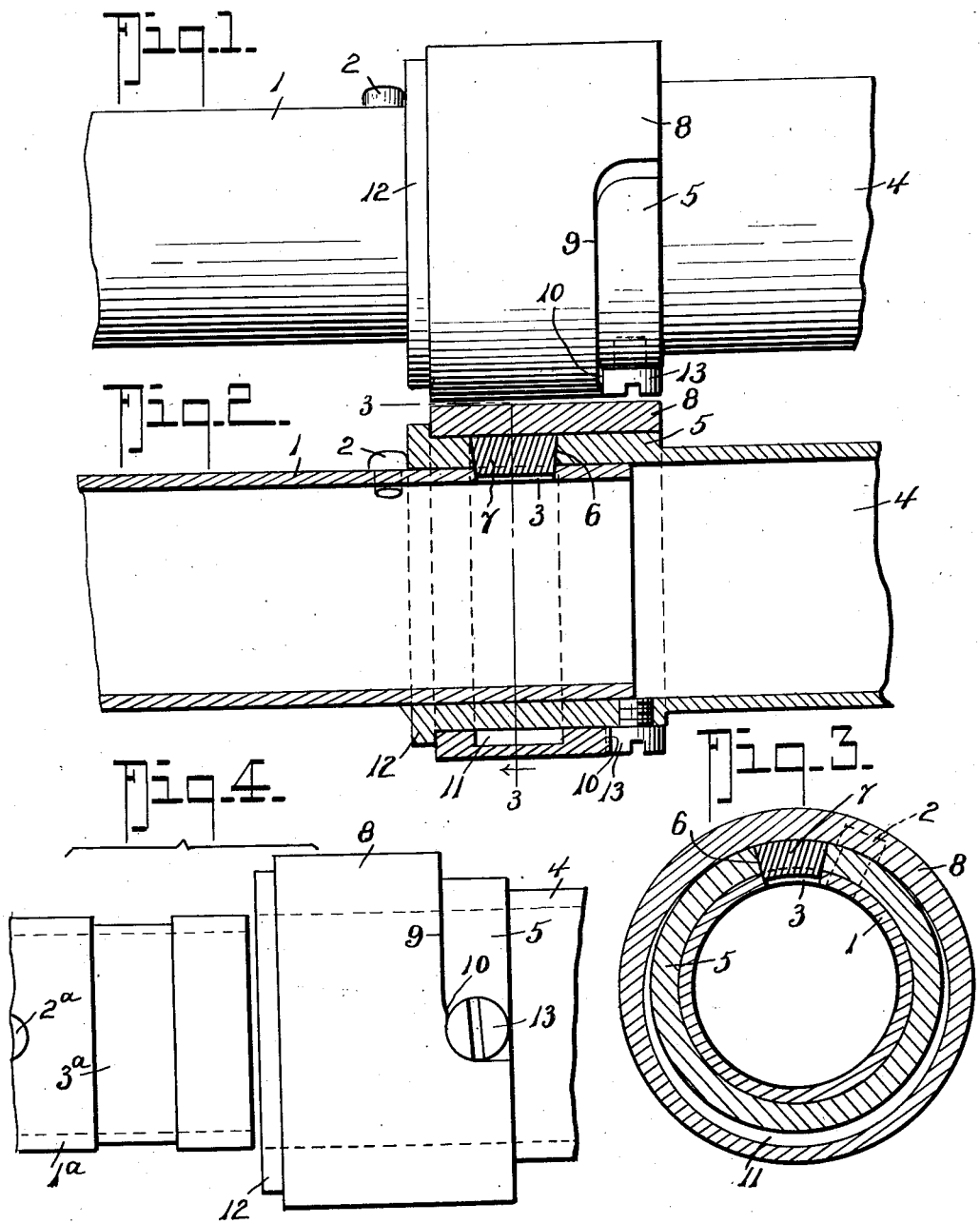

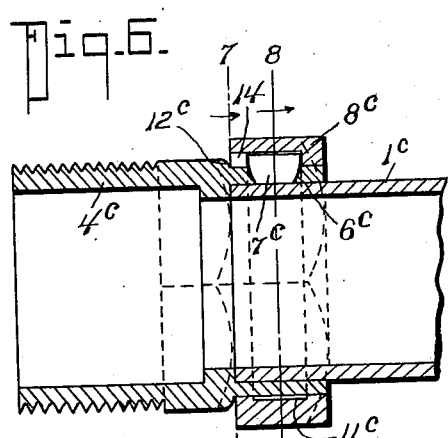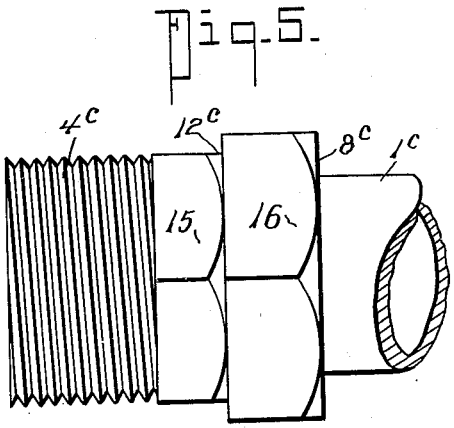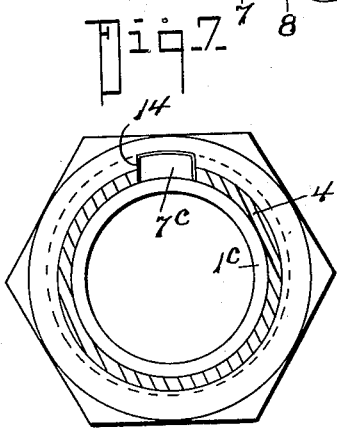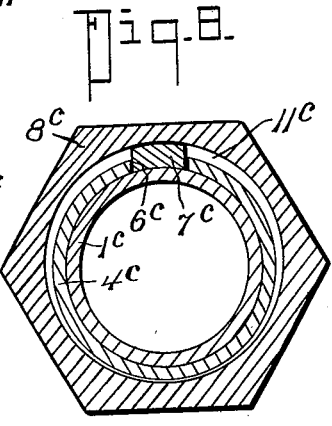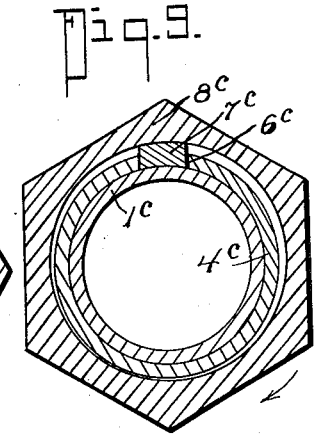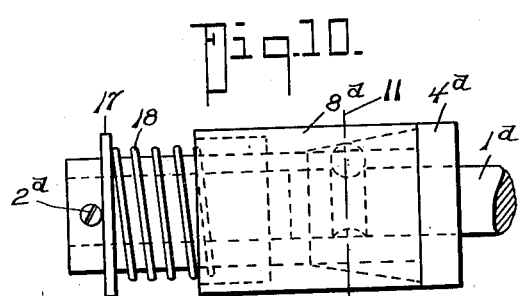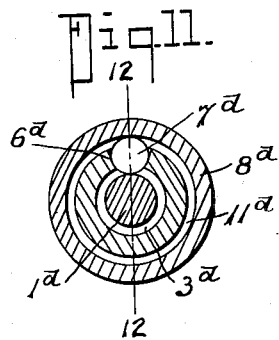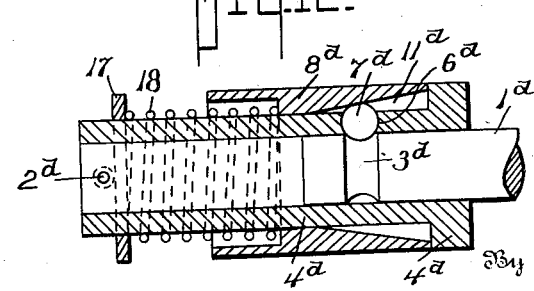

Patented Feb. 6, 1940

2,189,644

UNITED STATES PATENT OFFICE 2,189,644

MEANS FOR HOLDING TOGETHER PARTS HAVING TELESCOPIC ENGAGEMENT

Charles Leo Wingard, Portland, Oreg.

Application November 3, 1937, Serial No. 172,627

2 Claims. (Cl. 285—168)

My invention relates to means for securing together two parts which have a telescopic or male and female engagement with one another for the purpose of preventing these parts from being separated or pulled apart under conditions of use, and/or from rotating one with respect to the other on their joint axis.

The present invention has for an object to simplify the construction shown and described in my Patent No. 1,903,353, issued April 4, 1933. A further object is to provide a construction in which the locking key (or keys, if more than one is provided) may gravitate to its locking position and be held there by a rotatable collar that is carried by the female member in a hole in which the key is also carried.

Further, it is an object to provide a movable collar or member overlying the key and provided with an eccentric groove or a groove of varying depth for the purpose of releasing the key when it is desired to uncouple the male and female members.

Further, it is an object in one embodiment of the invention to provide means to limit the rotation of the collar and to latch it in its key-holding position.

Other objects will in part be obvious and in part be pointed out hereinafter.

To the attainment of the aforesaid objects and ends the invention still further resides in the novel details of construction, combination and arrangement of parts; all of which will be first fully described in the following detailed description, and then be particularly pointed out in the appended claims; reference being had to the accompanying drawings, in which:

Fig. 1 is an elevation of one form of the invention.

Fig. 2 is a vertical longitudinal section of the same.

Fig. 3 is a cross section on line 3—3 of Fig. 2.

Fig. 4 is a side elevation of a modification.

Fig. 5 is a side elevation of another embodiment of the invention.

Fig. 6 is a central vertical longitudinal section of the same.

Fig. 7 is a cross section on the line 7—7 of Fig. 6.

Fig. 8 is a cross section on the line 8—8 of Fig. 6.

Fig. 9 is a view like Fig. 8, showing the parts "locked" together.

Fig. 10 is a side elevation of another embodiment of the invention.

Fig. 11 is a cross section on the line 11—11 of Fig. 10.

Fig. 12 is a vertical longitudinal section on the line 12—12 of Fig. 11.

Fig. 13 is a side elevation of a further modification of the invention.

Fig. 14 is a cross section on the line 14—14 of Fig. 13.

Fig. 15 shows a modification of the embodiment shown in Figs. 13 and 14.

In the drawings, in which like numerals of reference indicate like parts in all the figures, 1 and 4 are the male and female members respectively. The male member 1 has a stop 2 and a key slot 3, while the female member has a key slot 6 and (preferably) an enlargement 5 on which the collar 8 is mounted. The key 7 lies in the slot 6 at all times and in slot 3 when the members are coupled together. The collar 8 has a cut away portion 9 in which lies a stop screw 13 that is threaded into the enlargement 5, the collar having a hump 10 over which stop 13 snaps to hold the collar in the key-locking position. (See Figs. 1, 2 and 4.)

A flange 12 on the enlargement 5 cooperates with stop 13 to hold the collar in place.

In the construction shown in Figs. 1 to 3, inclusive, the male and female members are locked together both against swiveling and against motion along their axes. If it be desired that the male member 1ª swivel in the female member 4, the male member may be provided with an annular groove 3ª in place of the key slot. In virtue of this construction when member 1ª is inserted into member 4 until stop 2ª engages flange 12, groove 3ª will register with key 7 and by turning collar 8 to position shown in Fig. 4 the parts will be locked together against being pulled apart, while allowing one to turn on its axis in the other.

With the parts held to present key 7 on top, the key will fall into slot 3, or if it be held below the axis, it will be forced to its locking position when collar 8 is turned because of the eccentric groove's peripheral wall engaging the outer face of the key.

The construction is also such that a smooth male member (one without slot 3 or groove 3ª) can be held in the female member by the key, due to the wedging action of the peripheral wall of groove 11 when collar 8 is turned to press key 7 inwardly.

Referring now to Figs. 6 to 9 inclusive, wherein is shown how my invention may be applied for coupling conduits: in these figures those parts which correspond in function to similar parts in the preceding figures bear the same reference numbers plus the index letter c. In the embodiment shown in these figures, the female member is a threaded coupling member 4c having a nut-like portion 15 to receive a wrench. The collar 8c also has flats 16 to receive a wrench. In this case the collar has an eccentric groove 11c into which the key 7c constantly projects, and thus the key keeps the collar in place. The collar, however (preferably at the deepest part of the groove 11c) has a cut out portion 14 which will pass the key 7c when it is desired to remove or assemble the collar from or on the female member 4c.

In order to secure the male member 1c and the female member 4c together, it is only necessary to turn collar 8c in one direction or the other on member 4c to cause the eccentric groove 11c to act and force key 7c tightly against member 1c, friction then being sufficient to hold the parts together.

In Figs. 10 to 12, inclusive, is shown another modification of the invention. In these figures those parts which correspond to the similar parts in preceding figures bear the same reference number plus the index letter d. In this form the collar 8d is one which works by sliding back and forth axially. It has, preferably, a tapered surface 11d which, when collar 8d is pushed forwardly by spring 18, serves to hold key (ball) 7d in recess 3d of rod 1d and, by sliding collar 8d back against spring-tension key 7d, may be released from groove 3d and 1d pulled out.

A washer 17, held in place by a pin or screw 2d, serves as an abutment for spring 18.

Figs. 13 and 14 show how my invention may be adapted as a nut lock. In these figures also those parts which correspond to similar parts in the other figures bear the same reference number, plus the index letter e. In this case the castle nut 4e is grooved as at 21 and in the groove is fitted a split ring 19. Instead of using a cotter-pin to hold the nut from turning, I use a straight pin 7e which passes through the hole 3e in the bolt 1e and is held in place by the ring 19. The ring 19 may have a slightly depressed portion 20 to enter the slots 6e of the nut and hold the ring against accidental rotation on the nut. The ring is also preferably knurled on its outer surface to facilitate turning it to bring the split in line with the key head so that the key may be withdrawn when it is desired to turn the nut.

The ring 19 may be made semi-rigid and of relatively heavy construction, as shown in Fig. 14, or it may be made of spring steel, as shown in Fig. 15. In this form the spring ring 19f has a curled end 20f to enter the slots 6f of the nut. In order to enable the ring 19f to be turned for releasing the key 7f, a suitable pointed instrument may be inserted in the loop 20f and the loop lifted out of the slot 6f and the ring 19f turned as required.

The uses to which the invention may be put are numerous, and I desire it to be understood that I do not wish to be limited to use on any particular male and female members.

From the foregoing description, taken in connection with the accompanying drawings, it is thought that the construction, operation and advantages of the invention will be clear to those skilled in the art.

What I claim is:

1. Means to hold male and female parts together, comprising in combination with engaging male and female elements, a locking key carried in an opening in said female element, said key and said opening having provisions to hold said key against longitudinal and transverse movements in said opening, and a shiftable band on said female element to overlie said key and having provisions to move said key to its locking position or permit release of the same, accordingly as said band is in one position or another, said band comprising a rotatable body with an internal annular eccentric groove into which said key constantly projects, and having a cut-away portion at one place to pass over said key in assembling or disassembling the parts.

2. In combination with a male and a female member, said female member having an opening, a locking key held in said opening against movement longitudinally and transversely of the opening, an inelastic ring rotatably mounted on said female member over said key and having an internal eccentric groove overlying said key and formed to project said key inwardly radially when said ring is in one position to engage with said male element and to release said key from engagement with the male element when said ring is in another position, and means to hold said ring against axial movement, said ring's groove defining opposed internally projecting annular flanges to engage the ends of the key, one of said flanges having a slot to pass said key when lined up therewith to permit placing and removing said ring, said ring holding means being removable when it is desired to remove the ring from its key operating position.

CHARLES LEO WINGARD.